United States Patent
Elliott et al.

(10) Patent No.: US 9,985,908 B2
(45) Date of Patent: *May 29, 2018

(54) ADAPTIVE BANDWIDTH CONTROL WITH DEFINED PRIORITIES FOR DIFFERENT NETWORKS

(71) Applicant: International Business Machines Corporation, Armonk, NY (US)

(72) Inventors: Steven L. Elliott, Austin, TX (US); Christopher V. Lazzaro, Austin, TX (US); Thanh K. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/462,365

(22) Filed: Aug. 18, 2014

(65) Prior Publication Data

US 2014/0355432 A1     Dec. 4, 2014

Related U.S. Application Data

(60) Continuation of application No. 13/306,860, filed on Nov. 29, 2011, now Pat. No. 8,811,424, which is a
(Continued)

(51) Int. Cl.
*H04L 12/26* (2006.01)
*H04L 12/911* (2013.01)
(Continued)

(52) U.S. Cl.
CPC ........ *H04L 47/821* (2013.01); *H04L 43/0864* (2013.01); *H04L 47/10* (2013.01);
(Continued)

(58) Field of Classification Search
CPC ... H04L 47/821; H04L 43/0864; H04L 47/12; H04L 47/283; H04L 47/29
(Continued)

(56) References Cited

U.S. PATENT DOCUMENTS 5,692,130 A    11/1997  Shobu et al.
6,088,578 A     7/2000  Manning et al.
(Continued)

FOREIGN PATENT DOCUMENTS

EP        1077559 A1    2/2001
JP      2004088219 A    3/2004
(Continued)

OTHER PUBLICATIONS

Brakmo et al., "TCP Vegas: New Technologies for Congestion Detectin and Avoidance," Computer Communication Review. vol. 24, No. 4, Oct. 1994, pp. 24-35.
(Continued)

*Primary Examiner* — Faisal Choudhury
(74) *Attorney, Agent, or Firm* — Yee & Associates, P.C.; Jeffrey S. LaBaw

(57) ABSTRACT

A computer implemented method, apparatus, and computer usable program code to receive data from a source at a plurality of gateways for distribution using a selected priority. The data is transmitted from the plurality of gateways to a plurality of receivers using the selected priority. Every gateway in the plurality of gateways has an adaptive bandwidth control process and a respective set of parameters for controlling the adaptive bandwidth control process for sending the data at the selected priority. Transmission of the data from each gateway for the selected priority has a different impact on other traffic at different gateways in the plurality gateways for the selected-priority when different values are set for the set of parameters for the different gateways.

19 Claims, 8 Drawing Sheets

Related U.S. Application Data continuation of application No. 12/782,425, filed on May 18, 2010, now Pat. No. 8,284,796, which is a division of application No. 12/138,036, filed on Jun. 12, 2008, now Pat. No. 8,094,681, which is a continuation of application No. 11/256,259, filed on Oct. 21, 2005, now Pat. No. 7,558,271.

(51) Int. Cl.
*H04L 12/801* (2013.01)
*H04L 12/851* (2013.01)
*H04L 12/807* (2013.01)
*H04L 12/841* (2013.01)

(52) U.S. Cl.
CPC .......... *H04L 47/12* (2013.01); *H04L 47/2433* (2013.01); *H04L 47/27* (2013.01); *H04L 47/283* (2013.01); *H04L 47/29* (2013.01)

(58) Field of Classification Search
USPC ........................................................ 370/230
See application file for complete search history.

(56) References Cited

U.S. PATENT DOCUMENTS

| | | | |
|---|---|---|---|
| 6,366,761 | B1 | 4/2002 | Montpetit |
| 6,578,075 | B1 | 6/2003 | Nieminen et al. |
| 7,035,211 | B1 | 4/2006 | Smith et al. |
| 7,418,494 | B2 | 8/2008 | Dahlin et al. |
| 7,440,761 | B2 | 10/2008 | Matsukura et al. |
| 7,474,614 | B2 | 1/2009 | Elliot et al. |
| 7,558,271 | B2 | 7/2009 | Elliot et al. |
| 7,643,417 | B2 | 1/2010 | Van Nieuwenhuizen |
| 7,680,035 | B2 | 3/2010 | Krishnan |
| 7,688,746 | B2 | 3/2010 | Hammarlund et al. |
| 7,724,620 | B2 | 5/2010 | Fuchiwaki |
| 7,796,517 | B2 | 9/2010 | Chen et al. |
| 7,869,395 | B2 | 1/2011 | Wise et al. |
| 7,885,188 | B2 | 2/2011 | Joshi |
| 7,953,113 | B2 | 5/2011 | Elliot et al. |
| 8,094,681 | B2 | 1/2012 | Elliot et al. |
| 8,125,910 | B2 | 2/2012 | Shimonishi et al. |
| 8,284,796 | B2 | 10/2012 | Elliot et al. |
| 8,493,859 | B2 | 7/2013 | Elliot et al. |
| 8,811,424 | B2 | 8/2014 | Elliot et al. |
| 2004/0064577 | A1 | 4/2004 | Dahlin et al. |
| 2004/0184406 | A1* | 9/2004 | Iwamura ............... H04B 3/542 370/235 |
| 2004/0219923 | A1 | 11/2004 | Oses et al. |
| 2005/0047364 | A1 | 3/2005 | Matsukura et al. |
| 2005/0108444 | A1 | 5/2005 | Flauaus et al. |
| 2005/0141554 | A1 | 6/2005 | Hammarlund et al. |
| 2005/0259682 | A1 | 11/2005 | Yosef et al. |
| 2005/0286416 | A1 | 12/2005 | Shimonishi et al. |
| 2006/0026004 | A1 | 2/2006 | Van Nieuwenhuizen |
| 2006/0029037 | A1 | 2/2006 | Chen et al. |
| 2006/0233108 | A1 | 10/2006 | Krishnan |
| 2007/0008884 | A1 | 1/2007 | Tang |
| 2007/0064577 | A1 | 3/2007 | Fuchiwaki |
| 2007/0064604 | A1* | 3/2007 | Chen ..................... H04L 1/0002 370/230 |
| 2007/0076626 | A1 | 4/2007 | Wise et al. |
| 2007/0091921 | A1 | 4/2007 | Elliot et al. |
| 2007/0091922 | A1 | 4/2007 | Elliot et al. |
| 2007/0091923 | A1 | 4/2007 | Elliot et al. |
| 2008/0192632 | A1* | 8/2008 | Bader ................. H04L 12/5695 370/230.1 |
| 2008/0212583 | A1 | 9/2008 | Rey et al. |
| 2008/0240156 | A1 | 10/2008 | Elliot et al. |
| 2008/0247419 | A1 | 10/2008 | Elliot et al. |
| 2008/0259803 | A1 | 10/2008 | Elliot et al. |
| 2010/0061236 | A1 | 3/2010 | Joshi |
| 2010/0223395 | A1 | 9/2010 | Elliot et al. |
| 2012/0075993 | A1 | 3/2012 | Elliot et al. |

FOREIGN PATENT DOCUMENTS

| | | |
|---|---|---|
| JP | 2004153505 A | 5/2004 |
| JP | 2005184494 A | 7/2005 |
| WO | WO0249254 A2 | 6/2002 |
| WO | WO02052768 A2 | 7/2002 |

OTHER PUBLICATIONS

Venkataramani et al., "TCP Nice: A Mechanism for Background Transfers," Proceedings of the 5th Symposium on Operating System Design and Implementation, ACM, New York, NY, pp. 329-343, Dec. 2002.
First Office Action, dated Aug. 3, 2010, regarding Chinese Application No. 200710187004.5, 7 pages. (English Translation).
Office Action, dated Dec. 21, 2010, regarding Japanese Application No. 2006-286657, 4 pages.
Excerpt of Office Action, dated Dec. 21, 2010, regarding Japanese Application No. 2006-286657, 2 pages. (English Translation).
Office Action, dated Jan. 5, 2011, regarding Japanese Application No. 2008-536010, 2 pages.
Office Action, dated Apr. 4, 2011, regarding Japanese Application No. 2006-0286657, 4 pages. (with English Translation of Reasons for Rejection).
Notice of Allowance, dated Aug. 26, 2008, regarding U.S. Appl. No. 11/256,261, 14 pages.
Office Action, dated Apr. 12, 2010, regarding U.S. Appl. No. 12/138,982, 46 pages.
Final Office Action, dated Sep. 30, 2010, regarding U.S. Appl. No. 12/138,982, 48 pages.
Notice of Allowance, dated Jan. 24, 2011, regarding U.S. Appl. No. 12/138,982, 6 pages.
Office Action, dated Oct. 3, 2008, regarding U.S. Appl. No. 11/256,260, 11 pages.
Final Office Action, dated Apr. 6, 2009, regarding U.S. Appl. No. 11/256,260, 5 pages.
Office Action, dated Jan. 11, 2010, regarding U.S. Appl. No. 12/132,236, 12 pages.
Final Office Action, dated Jul. 23, 2010, regarding U.S. Appl. No. 12/132,236, 16 pages.
Final Office Action, dated Sep. 30, 2010, regarding U.S. Appl. No. 12/132,236, 17 pages.
Office Action, dated Jan. 7, 2011, regarding U.S. Appl. No. 12/132,236, 20 pages.
Final Office Action, dated Jul. 7, 2011, regarding U.S. Appl. No. 12/132,236, 22 pages.
Final Office Action, dated Dec. 21, 2011, regarding U.S. Appl. No. 12/132,236, 17 pages.
Notice of Allowance, dated Sep. 19, 2012, regarding U.S. Appl. No. 12/132,236, 5 pages.
Notice of Allowance, dated Apr. 2, 2013, regarding U.S. Appl. No. 12/132,236, 6 pages.
Office Action, dated Aug. 21, 2008, regarding U.S. Appl. No. 11/256,259, 15 pages.
Notice of Allowance, dated Mar. 9, 2009, regarding U.S. Appl. No. 11/256,259, 4 pages.
Office Action, dated May 14, 2010, regarding U.S. Appl. No. 12/138,036, 47 pages.
Final Office Action, dated Oct. 27, 2010, regarding U.S. Appl. No. 12/138,036, 16 pages.
Final Office Action, dated Jun. 16, 2011, regarding U.S. Appl. No. 12/138,036, 16 pages.
Notice of Allowance, dated Sep. 7, 2011, regarding U.S. Appl. No. 12/138,036, 5 pages.
Office Action, dated Dec. 27, 2010, regarding U.S. Appl. No. 12/782,425, 53 pages.
Final Office Action, dated Jun. 15, 2011, regarding U.S. Appl. No. 12/782,425, 22 pages.
Notice of Allowance, dated Mar. 21, 2012, regarding U.S. Appl. No. 12/782,425, 7 pages.
Notice of Allowance, dated May 31, 2012, regarding U.S. Appl. No. 12/782,425, 9 pages.

(56) References Cited

OTHER PUBLICATIONS

Office Action, dated Apr. 1, 2013, regarding U.S. Appl. No. 13/306,860, 42 pages.
Final Office Action, dated Dec. 5, 2013, regarding U.S. Appl. No. 13/306,860, 14 pages.
Notice of Allowance, dated Apr. 14, 2014, regarding U.S. Appl. No. 13/306,860, 5 pages.

* cited by examiner

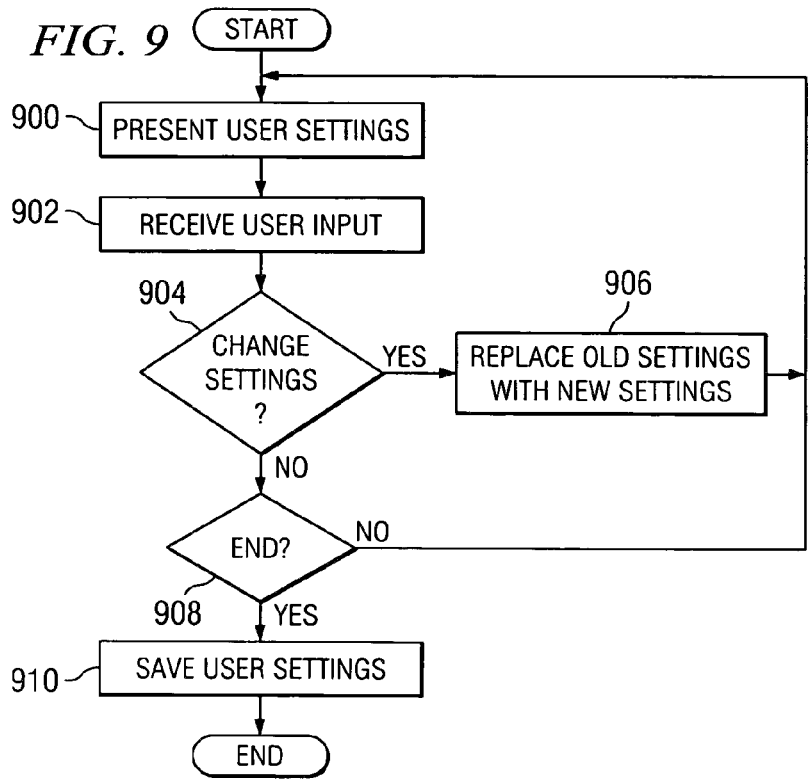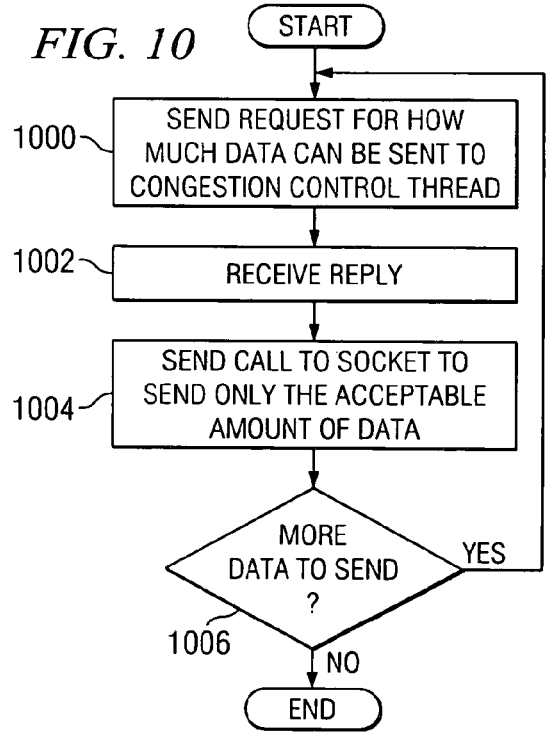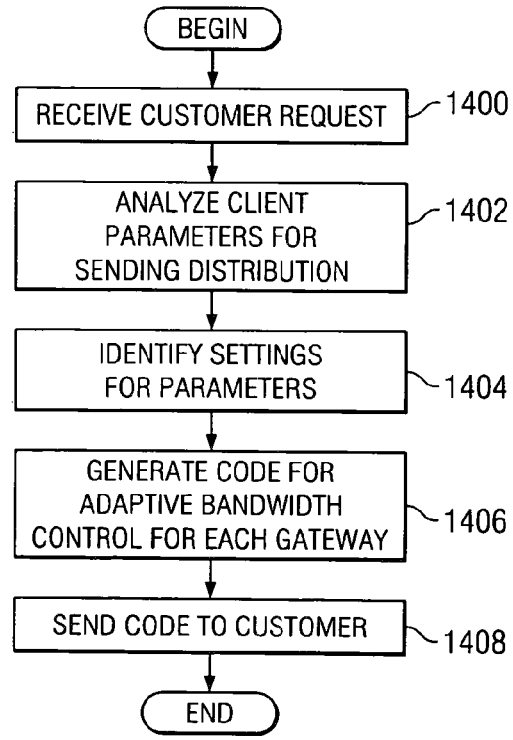

ADAPTIVE BANDWIDTH CONTROL WITH DEFINED PRIORITIES FOR DIFFERENT NETWORKS

CROSS REFERENCE TO RELATED APPLICATIONS

This application is a continuation of U.S. patent application Ser. No. 13/306,860, filed Nov. 29, 2011, now U.S. Pat. No. 8,811,424 issued on Aug. 19, 2014; which is a continuation of U.S. patent application Ser. No. 12/782,425, filed May 18, 2010, now U.S. Pat. No. 8,284,796 issued on Oct. 9, 2012; which is a division of U.S. patent application Ser. No. 12/138,036, filed Jun. 12, 2008, now U.S. Pat. No. 8,094,681 issued on Jan. 10, 2012; which is a continuation of U.S. patent application Ser. No. 11/256,259 filed Oct. 21, 2005, now U.S. Pat. No. 7,558,271 issued on Jul. 7, 2009. The contents of the aforementioned applications are incorporated herein by reference.

BACKGROUND OF THE INVENTION

1. Field of the Invention

The present invention relates generally to an improved data processing system and in particular, to a computer implemented method and apparatus for transferring data. Still more particularly, the present invention relates to a computer implemented method, apparatus, and computer usable program code for adaptively controlling bandwidth used to transfer data.

2. Description of the Related Art

With the common use of networks and the Internet, communications in commerce has been revolutionized. Networks are commonly used to transfer data. Many distributed applications make use of large background transfers to improve the service quality. With these types of background transfers, users are not required to wait for these transfers to complete before performing other actions. A broad range of applications and services including, for example, data backup, prefetching, enterprise data distribution, Internet content distribution, and peer-to-peer storage employ background transfers. These and other types of applications increase network bandwidth consumption. Some of these services have potentially unlimited bandwidth demands in which the use of incrementally more bandwidth provides incrementally better service.

One problem with these types of applications is that most networks have only a limited amount of bandwidth available for transferring data. Some applications perform critical functions while others are non-critical. Typically, background transfers are non-critical and may use all available bandwidth slowing down critical network traffic.

Adaptive bandwidth controls have been employed to automatically adapt to network conditions to reduce the impact to the network. Currently, different adaptive bandwidth control processes and algorithms are employed to control the amount of bandwidth used by different applications to avoid congestion. Currently available adaptive bandwidth control processes take into account the network conditions at the local interface level, either on the server or client computer and are unable to take into account other conditions that may exist in the transfer of data.

Therefore, it would be advantageous to have an improved computer implemented method, apparatus, and computer usable program code to adaptively control bandwidth usage in transferring data.

SUMMARY OF THE INVENTION

The present invention provides a computer implemented method, apparatus, and computer usable program code to receive data from a source at a plurality of gateways for distribution using a selected priority. The data is transmitted from the plurality of gateways to a plurality of receivers using the selected priority. Every gateway in the plurality of gateways has an adaptive bandwidth control process and a respective set of parameters for controlling the adaptive bandwidth control process for sending the data at the selected priority. Transmission of the data from each gateway for the selected priority has a different impact on other traffic at different gateways in the plurality gateways for the selected priority when different values are set for the set of parameters for the different gateways.

The set of parameters may comprise a threshold, beta, and a maximum wait time. The set of parameters may be configured for a particular gateway in the plurality of gateways, wherein the set of parameters for the particular gateway may be different from the set of parameters for another gateway in the plurality of gateways. The adaptive bandwidth control process takes into account congestion along a path from a gateway in the plurality of gateways to a receiver of the distribution. Also, the respective set of parameters may be different for different gateways in the plurality of gateways. In the illustrative examples, the data comprises one of a data file, an application update, and a virus patch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart of a process for configuring user settings for parameters in accordance with an illustrative embodiment of the present invention;

FIG. 10 is a flowchart of a process for a send thread in accordance with an illustrative embodiment of the present invention;

FIG. 14 is a flowchart of a process for customizing the sending of distributions to receivers for a customer in accordance with an illustrative embodiment of the present invention.

DETAILED DESCRIPTION OF THE PREFERRED EMBODIMENT

Figure 1:
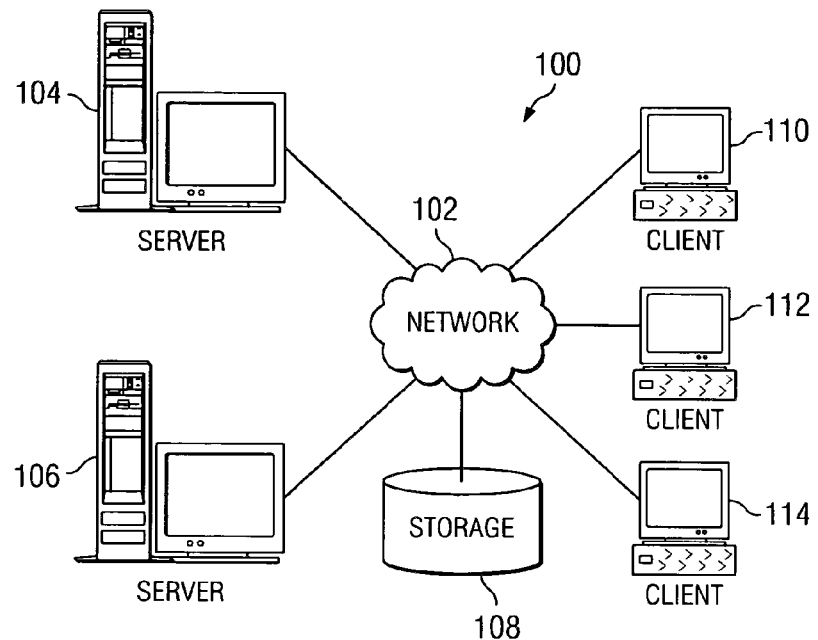
FIG. 1 is a pictorial representation of a network of data processing systems in which aspects of the present invention may be implemented.
Figure 2:
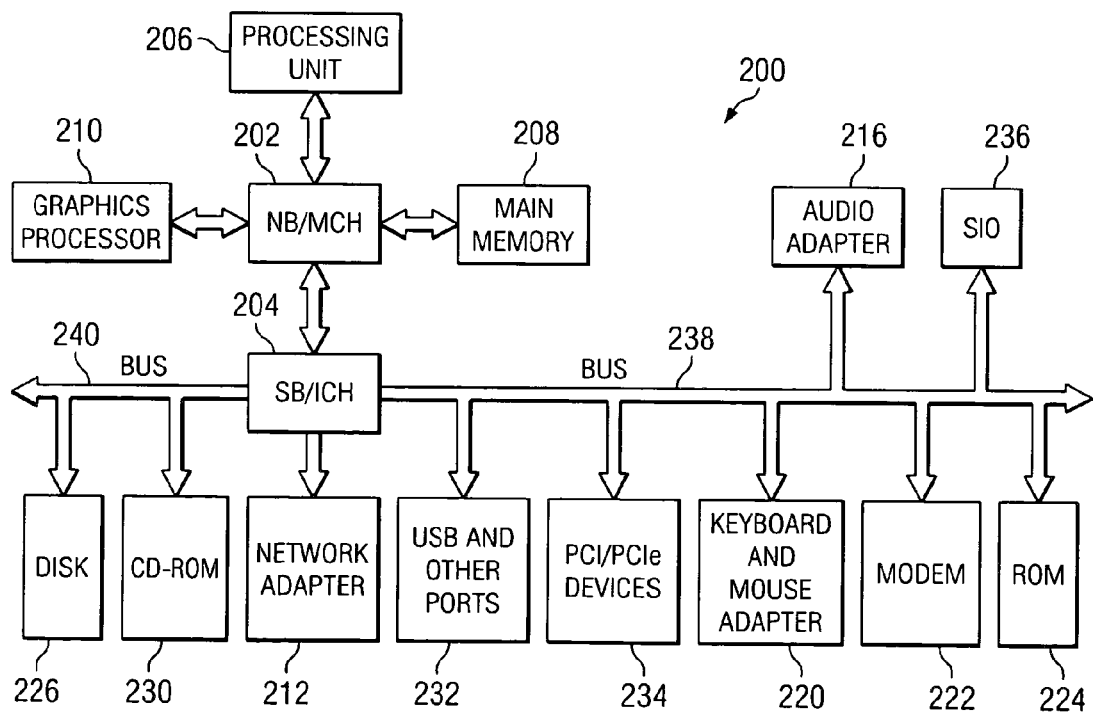
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, apparatus, and computer usable program code for adaptively controlling bandwidth used in transferring data. The aspects of the present invention recognize that currently used adaptive bandwidth control processes are unable to take into account network conditions beyond those at the client. The aspects of the present invention recognize that different networks have different characteristics, which may affect the transfer of data. The aspects of the present invention provide different mechanisms for taking these types of factors into account. The aspects of the present invention provide an ability to set parameters to control how individual data packets are sent on a network for use in adaptive bandwidth control.

The aspects of the present invention recognize that currently available data transfer systems tend to run too slowly in background modes and may take a very long time to complete. The aspects of the present invention also recognize that many cases exist in which customers desire adaptive functionality and do not want distributions to take a long time in certain cases. For example, a distribution of virus patches or updates is considered very important with respect to an update to an application. Thus, the aspects of the present invention provide an ability to set a priority on a per-distribution basis. In these illustrative examples, three different priorities are set: high, medium, and low. The priority in these examples is an adaptive priority in which a selected priority, such as high, changes the way an adaptive bandwidth control process behaves. For example, a software update may be sent as a low priority followed by a virus patch at a high priority. As a result, different distributions may be given different priorities based on the importance of those distributions. The distributions with the different priorities provide a different set of parameters to the adaptive bandwidth control process to alter the behavior of this process depending on the particular priority selected.

Additionally, the configuration of the different priorities also may be set on a per-gateway basis. In these examples, a gateway is a device or data processing system that serves as a conduit to a set of devices. For example, a gateway may serve as a portal or entrance to a local area network or a wide area network. Additionally, a gateway also may serve as a connection to a wireless network. The gateway also is referred to as managing a set of clients.

Although these illustrative examples are directed towards adaptive bandwidth control, the aspects of the present invention may be applied to any type of transfer of bulk data to one or more target data processing systems.

Figure 3:
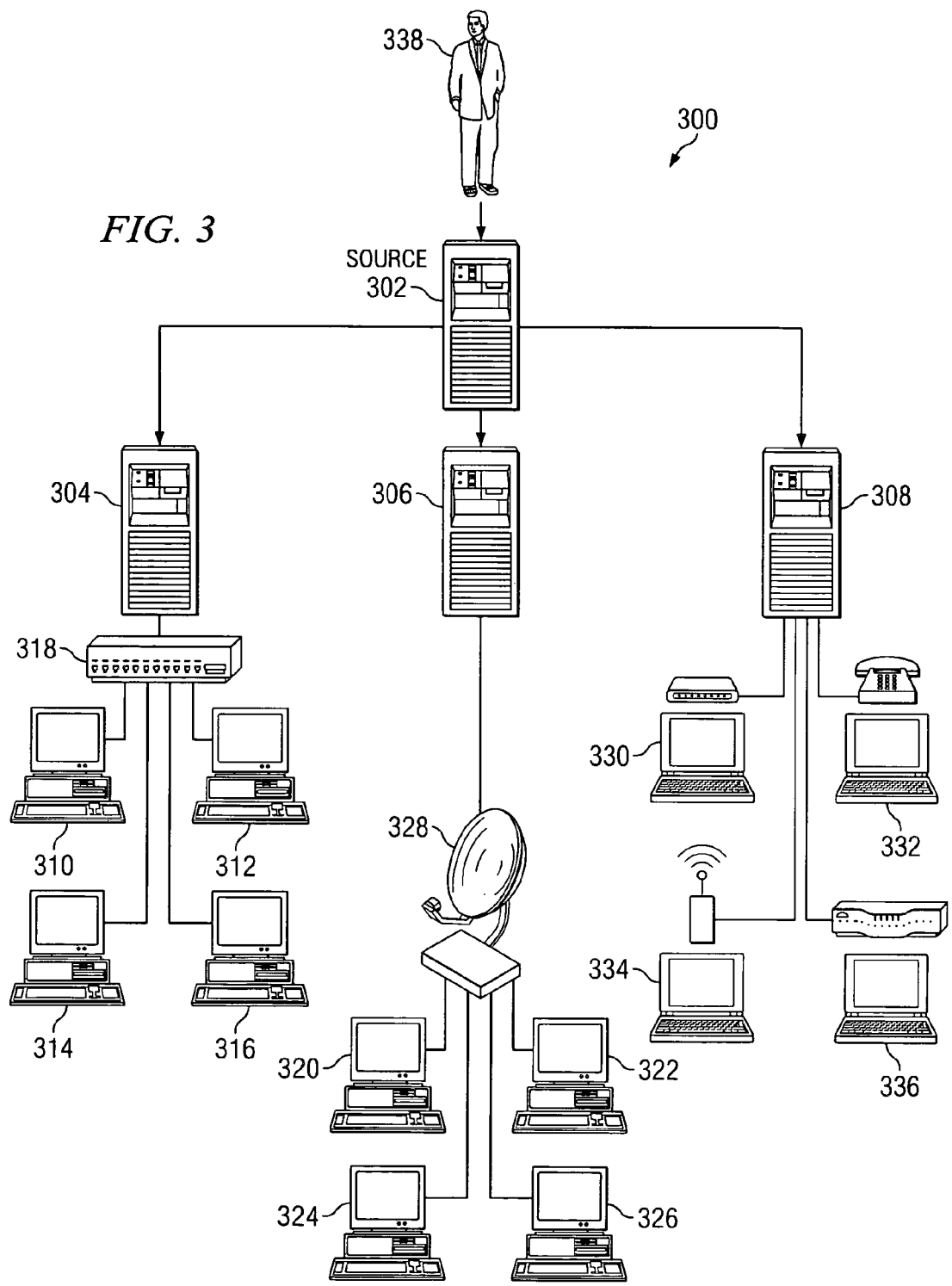
FIG. 3 is a diagram illustrating an example network data processing system in which distributions may be made using different priorities in accordance with an illustrative embodiment of the present invention.

Turning now to FIG. 3, a diagram illustrating an example network data processing system in which distributions may be made using different priorities is depicted in accordance with an illustrative embodiment of the present invention. In this example, network data processing system 300 contains source 302, which is connected to gateways 304, 306, and 308. Gateway 304 provides a connection to clients 310, 312, 314, and 316 through router 318. Gateway 306 provides a connection to clients 320, 322, 324, and 326 through satellite router 328. Gateway 308 provides a connection to clients 330, 332, 334, and 336. In these examples, these clients are traveling laptop computers that connect to gateway 308 through various means, such as a wireless connection, a dial-up connection, a cable modem, or some other similar connection system.

Network 300 is an example of a network contained within network data processing system 100 in FIG. 1. In particular, the different clients and gateways may be implemented using a data processing system similar to data processing system 200 in FIG. 2.

In this example, gateway 304 manages highly secure local area network servers. In other words, clients 310, 312, 314, and 316 are server data processing systems. Gateway 306 manages point-of-sale systems located in different branch offices. Gateway 308 is used to manage clients in the form of traveling laptops.

Administrator 338 may send a distribution using different settings. In these examples, a distribution is the sending of any sort of data to one or more endpoints or receivers. For example, distribution may be an update to an application, a dynamic link library update, a virus patch or definition update, or a data file. In this illustrative example, a distribution may be sent using one of three priority levels, high, medium, or low. Of course, other numbers of priority levels may be implemented depending on the particular implementation. Three different priority levels are employed for purposes of illustrating one embodiment of the present invention.

As a result, administrator 338 may send one distribution to gateways 304, 306, and 308 for distribution to the clients with one priority, such as high. Administrator 338 may then send a subsequent distribution to gateways 304, 306, and 308 with a different priority, such as medium. In this manner, different distributions may be given different priorities for transfer to the receivers based on the importance associated with a particular distribution. As a result, more important distributions may reach clients more quickly, although this type of distribution uses more bandwidth. With a lower priority distribution, less bandwidth is used with that type of distribution taking more time to distribute.

Further, the aspects of the present invention provide an ability for a selected priority to use different amounts of bandwidth at different gateways for the selected priority level. In other words, for a selected priority level, two gateways may use different amounts of bandwidth to transfer data given the same network conditions. The different effects of a selected priority level are adjusted on a per-gateway basis in these illustrative examples by adjusting parameters in the adaptive bandwidth control process executing on those gateways to send the distribution to the different clients.

For example, gateway 304 may use seventy percent of the bandwidth when sending a high priority distribution to clients 310, 312, 314, and 316. Gateway 306 may use fifty percent of the bandwidth in transferring the same distribution with a high priority to clients 320, 322, 324, and 326. At gateway 308, the same distribution being sent at a high priority may only use up thirty percent of the bandwidth in sending the same distribution to clients 330, 332, 334, and 336.

The actual impact on bandwidth usage within a particular network accessed by a gateway is adjusted by adjusting parameters in the adaptive bandwidth control process executing on those gateways. Each of these gateways may be preconfigured when the gateways are initially set up. Additionally, these parameters may be changed based on changes in the network or other changes as identified by administrator 338. These changes may be administered through user-defined settings as discussed below.

Figure 4:
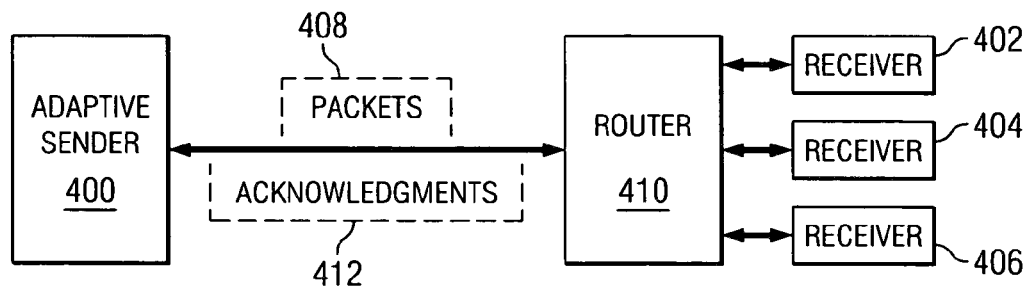
FIG. 4 is a diagram illustrating components used in adaptive bandwidth control in accordance with an illustrative embodiment of the present invention.

Turning now to FIG. 4, a diagram illustrating components used in adaptive bandwidth control is depicted in accordance with an illustrative embodiment of the present invention. In this example, adaptive sender 400 sends data to receivers 402, 404, and 406. In this illustrative example, adaptive sender 400 may be a gateway, such as gateway 304 in FIG. 3. In particular, adaptive sender 400 may be implemented as server 106 in FIG. 1 using hardware such as that found in data processing system 200 in FIG. 2. Receivers 402, 404, and 406 may be clients, such as clients 310, 312, and 314 in FIG. 3. These receivers also may be implemented using a data processing system, such as data processing system 200 in FIG. 2. The data is sent by sending packets 408 to a routing mechanism, such as router 410. Router 410 is a device that serves to route or send packets 408 to the appropriate receivers based on routing data found in packets 408. When router 410 is forced to process too many packets, it is referred to as a backlogged router. In other words, the backlog router is the router that has the most load or largest number of packets in its queue. There can be zero or more routers between a sender and a receiver. The sender is the source of packets and the receivers are the source of acknowledgements. As these receivers receive packets 408, they return acknowledgements 412 to adaptive sender 400. In this example, the acknowledgements are part of regular TCP/IP communication.

In these illustrative examples, adaptive sender 400 may be implemented as a process in a data processing system, such as server 104 in FIG. 1. Receivers 402, 404, and 406 are processes that may execute on a receiving device, such as clients 108, 110 and 112 in FIG. 1. In particular, these different processes may be implemented on a data processing system, such as data processing system 200 in FIG. 2.

Adaptive sender 400 tracks packets 408 sent to each receiver. The receipt of acknowledgements 412 also is tracked and is used to identify parameters, such as round trip time. Round trip time is the time from which a packet is sent until the acknowledgement is received. In this example, the round trip time is based on the perspective of adaptive sender 400.

Additionally, this information is used to identify blocks. A block begins when an arbitrary packet is sent; statistical data is kept for all of the packets in the block until the initial packet which began the block is acknowledged by the receiver. When the acknowledgement for the arbitrary packet is returned, adaptive sender 400 calculates the statistics for that block of packets. In other words, one or more packets may be present in a block depending on how many packets are sent before the acknowledgement for the arbitrary packet in the beginning of the block has been returned. Additionally, adaptive sender 400 also identifies a window. A window is the number of packets in the network that had been sent without receiving an acknowledgement.

Further, adaptive sender 400 also estimates the number of packets that are located in router 410. This information is determined using the current round trip time to calculate the expected number of unacknowledged packets versus the real number of unacknowledged packets. For example, if five packets should exist on a network because of current round trip times and eight unacknowledged packets are identified by adaptive sender 400, adaptive sender 400 can estimate that three packets are located on router 410.

Adaptive sender 400 controls the speed by increasing or decreasing the expected window size while attempting to keep a selected number of packets on router 410. A large window is more aggressive because router 410 spends more time in processing adaptive packets versus other network traffic. In this manner, adaptive sender 400 may tune an alpha and beta parameter for router 410. Alpha is an integer indicating the minimum number of packets in router 410 per connection before the window is increased by one packet. Beta is an integer that indicates the maximum number of packets in the backlog router per connection before the window is decreased by one packet. These parameters allow for small increases or decreases in speed by adjusting the window based on alpha and beta. Another parameter, threshold, allows a quick decrease in speed when 50% of the packets in a block meet the conditions of this threshold. In this example, threshold is a configurable percentage of the time from base round trip time to max round trip time.

Figure 5:
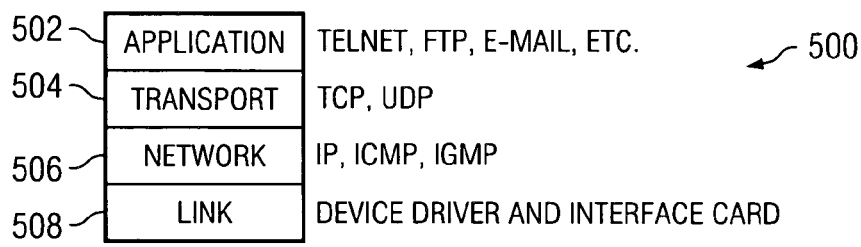
FIG. 5 is a diagram of a transmission control protocol/Internet protocol (TCP/IP) and similar protocols in accordance with an illustrative embodiment of the present invention.

Turning to FIG. 5, a diagram of a transmission control protocol/Internet protocol (TCP/IP) and similar protocols are depicted in accordance with an illustrative embodiment of the present invention. TCP/IP and similar protocols are utilized by communications architecture 500. In this example, communications architecture 500 is a 4-layer system. This architecture includes application layer 502, transport layer 504, network layer 506, and link layer 508. Each layer is responsible for handling various communications tasks. Link layer 508 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 506 also is referred to as the Internet layer and handles the movement of packets of data around the network. For example, network layer 506 handles the routing of various packets of data that are transferred over the network. Network layer 506 in the TCP/IP suite is comprised of several protocols, including Internet protocol (IP), Internet control message protocol (ICMP), and Internet group management protocol (IGMP).

Next, transport layer 504 provides an interface between network layer 506 and application layer 502 that facilitates the transfer of data between two host computers. Transport layer 504 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other without providing any mechanism for guaranteeing that the data is properly transferred. When using UDP, the application layer must perform the reliability functionality.

Application layer 502 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The aspects of the present invention are implemented in application layer 502 to adaptively control the transfer of data in a manner that allows for user settings to be input by a user. In this manner, the user may change different settings to control how packets are sent on the network for use in adaptive bandwidth control. By allowing user settings to be input from the application level, a user may make changes for different types of networks and different network conditions that are not typically taken into account by adaptive bandwidth control processes. In this manner, conditions other than those on the clients may be taken into account. For example, the aspects of the present invention allow a user to change settings based on an identification of factors, such as the number of hops in a path to the receiver and links in the path to the receiver that have a large amount of traffic or congestion.

Although the illustrative examples of the present invention are implemented on an application level, the different processes also may be implemented on other layers. For example, the aspects of the present invention may be implemented within transport layer 504 or network layer 506 depending on the particular implementation.

Figure 6:
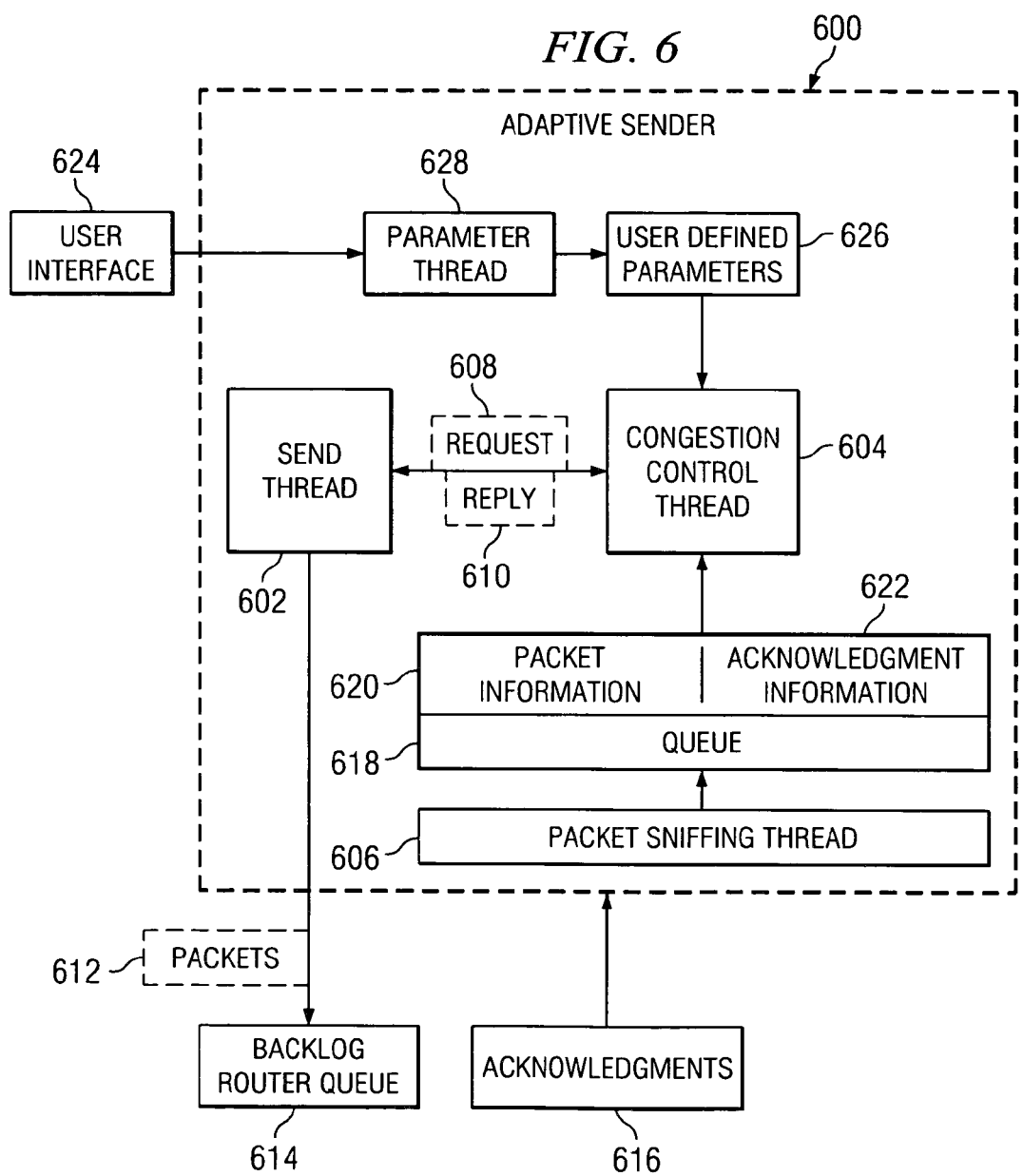
FIG. 6 is a diagram illustrating software processes and components used in providing adaptive bandwidth control in accordance with an illustrative embodiment of the present invention.

Turning now to FIG. 6, a diagram illustrating software processes and components used in providing adaptive bandwidth control is depicted in accordance with an illustrative embodiment of the present invention. In this example, adaptive sender 600 is a more detailed illustration of processes within adaptive sender 400 in FIG. 4. Adaptive sender 600 contains three threads in this illustrative example. Send thread 602, congestion control thread 604, and packet sniffing thread 606 are the components used to adaptively send data to one or more receivers. Send thread 602 is used to send data through making calls to a socket. A socket is a software object that connects an application to a network protocol, such as a TCP/IP protocol in a TCP/IP stack.

Send thread 602 sends request 608 to congestion control thread 604 to ask how much data may be sent by send thread 602. Congestion control thread 604 returns reply 610, telling how much data may be sent. Send thread 602 uses reply 610 to send packets 612 for transmission. These packets are stored in backlog router queue 614 until a backlog router routes the packets to their destination. Backlog router queue 614 is located on a backlog router, such as router 410 in FIG. 4. Acknowledgements 616 are returned to adaptive sender 600 when the packets are received.

Congestion control thread 604 identifies the amount of data to be sent by performing an adaptive bandwidth control process. Congestion control thread 604 in these examples uses the adaptive bandwidth control process to adaptively identify transmission rates for transmitting data packets over a network in response to changes in network conditions. These network conditions include, for example, the amount of congestion on the network due to various other transmissions of data in addition to those being processed by the adaptive sender. In other words, the rate of speed at which data may be sent changes according to the network conditions. Congestion control thread 604 identifies different rates that speed up or slow down to maintain a minimal network impact based on the different parameters that are set by the user.

An example of network conditions is illustrated using FIG. 7 below. Prior to FTP server 752 sending data to FTP client 754, the condition of router 746 is idle. This situation allows adaptive sender 700 to send to receivers or endpoints at a very high rate of speed, even when priority is low. However, as soon as FTP server 752 begins sending data to FTP client 754, router 746 becomes flooded. Then, the adaptive bandwidth control process will react according to its priority. At a low priority, the adaptive bandwidth control process will slow down to where it hardly sends anything at all, and will have minimal impact on the FTP distribution. At high priority, this process will send very quickly and cause the FTP distribution to slow down.

The following is another example of how adaptive distributions will react to network conditions. A bank contains a single router that manages the network connection for 10 systems inside the bank. Through this router the bank is connected to a central site (which manages 300 banks nationwide). At 6 am (prior to the bank opening) no one is in the bank, and the network (specifically the bank's single router) is idle. At this time, a very large adaptive distribution is sent at low priority from the central site. Because the distribution is the only traffic on the bank's router, the distribution speeds up to use 100 percent of the router's bandwidth. This continues until 8 am, when customers begin using the bank's ATM and loan processing systems that also must share the network with the single router. The adaptive distribution will immediately recognize that there is additional traffic across the slow link (the bank's router in this scenario). Because adaptive distribution is at low priority, it will slow down to use a very small percentage of the router causing minimal impact on the ATM and loan processing traffic. At 5 pm the adaptive distribution is still in progress. The loan-processing traffic decreases as the bank closes. The adaptive distribution will sense the reduced load of the network and continue to speed up as more bandwidth becomes available.

Referring back to FIG. 6, this process uses information located in queue 618. In particular, packet sniffing thread 606 grabs packets and acknowledgements from the network and places packet information 620 and acknowledgement information 622 into queue 618. Packet sniffing thread 606 filters the packets and acknowledgements to place appropriate data needed by congestion control thread 604 into queue 618. Alternatively, all of the packets and acknowledgements may be placed into queue 618 for processing by congestion control thread 604. The information in queue 618 is used by congestion control thread 604 to identify parameters, such as a round trip time from when a packet was sent until the acknowledgement for the packet was received. Other parameters that may be identified and maintained by congestion control thread 604 from information in queue 618 include a block, a window, and the packets in the backlog router.

Further, the aspects of the present invention include user interface 624 which may be used to set user defined parameters 626. User interface 624 is provided by parameter thread 628. Typically, the parameters are set up when the adaptive process is first set up on a system. These parameters may be altered through user interface 624 and parameter thread 628. User defined parameters 626 are stored in a non-volatile memory, such as a disk. These parameters can be later read when the adaptive bandwidth process initiates. In this illustrative example, these parameters include a set of parameters in which different values are present for different priorities. In the illustrative examples, the set of parameters that change based on the priority level of a distribution are threshold, data, and maximum wait time. Although a user may input the different values for the different priority levels, these parameters may be set directly for use by adaptive sender 600. User interface 624 allows the user to select or input various parameters for use by congestion control thread 604 in performing adaptive bandwidth control processes.

In these illustrative examples, the aspects of the present invention allow a user to enter or select values for five parameters. These five parameters comprise a threshold, a round trip time maximum change, beta, round trip time smoothing, and a maximum wait time. The round trip time maximum change is a parameter used to restrict the amount of change in the currently measured round trip time relative to the previous measured round trip time. The process tracks the current round trip time, the maximum round trip time and the base round trip time.

The congestion control thread tracks the round trip times on a per-socket basis and sequence. If one packet has a round trip time of ten and a second packet has a round trip time of twenty, then the second packet round trip time is limited by a round trip time maximum change value of one point five (1.5). Even though the real round trip time is twenty, the round trip time value is recorded as ten times one point five equals fifteen (10×1.5=15). Then, the subsequent packet may have a round trip time at the most of one point five times fifteen (1.5×15), the round trip time recorded for the second packet.

Networks typically have some amount of randomness. This parameter allows an adaptive bandwidth control process to ignore an overly large or overly small round trip time, but still allow for large round trip times if they occur often enough. This parameter allows the user to configure how much change is tolerated.

The round trip time smoothing parameter in these examples is an integer used to indicate how much the round trip time measurements should be smoothed by exponential decay. The exponential decay is performed by averaging the previous measurement. This parameter may help in cases in which the adaptive bandwidth control process behaves erratically by overcompensating for fluctuations in round trip time. The smoothing typically occurs before the maximum change parameter is taken into account.

The maximum wait time is a parameter that indicates what multiple of maximum round trip time a connection will wait to send before giving up and resetting. Sometimes acknowledgements may be lost on a network causing the sender to wait for a long period of time before sending additional data. This is a reset value to reset the process of adaptive bandwidth control if too much time has passed before data has been sent. With respect to the threshold parameter, when round trip times of packets are sent on a socket, the times tend to fall within a selected range. This situation is especially true when the network is idle.

The threshold is a percentage of the way from the minimum round trip time to the maximum round trip time. For example, a threshold of twenty percent means that the threshold is twenty percent of the way from the base round trip time to the maximum round trip time. Depending on the type of network, round trip times will have more or less variation. The different variations typically require different threshold values. For example, a well behaved local area network will have very little round trip time variation, allowing for a low threshold value. A wide area network will have higher round trip time variations. With this type of network, a higher threshold is required. This particular parameter is user configurable to take into account different types of networks that may be encountered in sending data. With respect to the threshold parameter, when round trip times of packets are sent on a socket, the times tend to fall within a selected range. This situation is especially true when the network is idle.

If the round trip time of a packet is slower than the threshold value, this packet is considered slow. If fifty percent of the packets in a block are considered to be slow, then the window may be cut in half, greatly reducing the speed of distribution. As a result, allowing for user configuration of this value allows for taking into account different network types and conditions.

The aspects of the present invention changes priorities by modifying three parameters in the illustrative examples. The parameters modified for the different priorities in these examples are the threshold, beta, and the maximum wait time.

Figure 7:
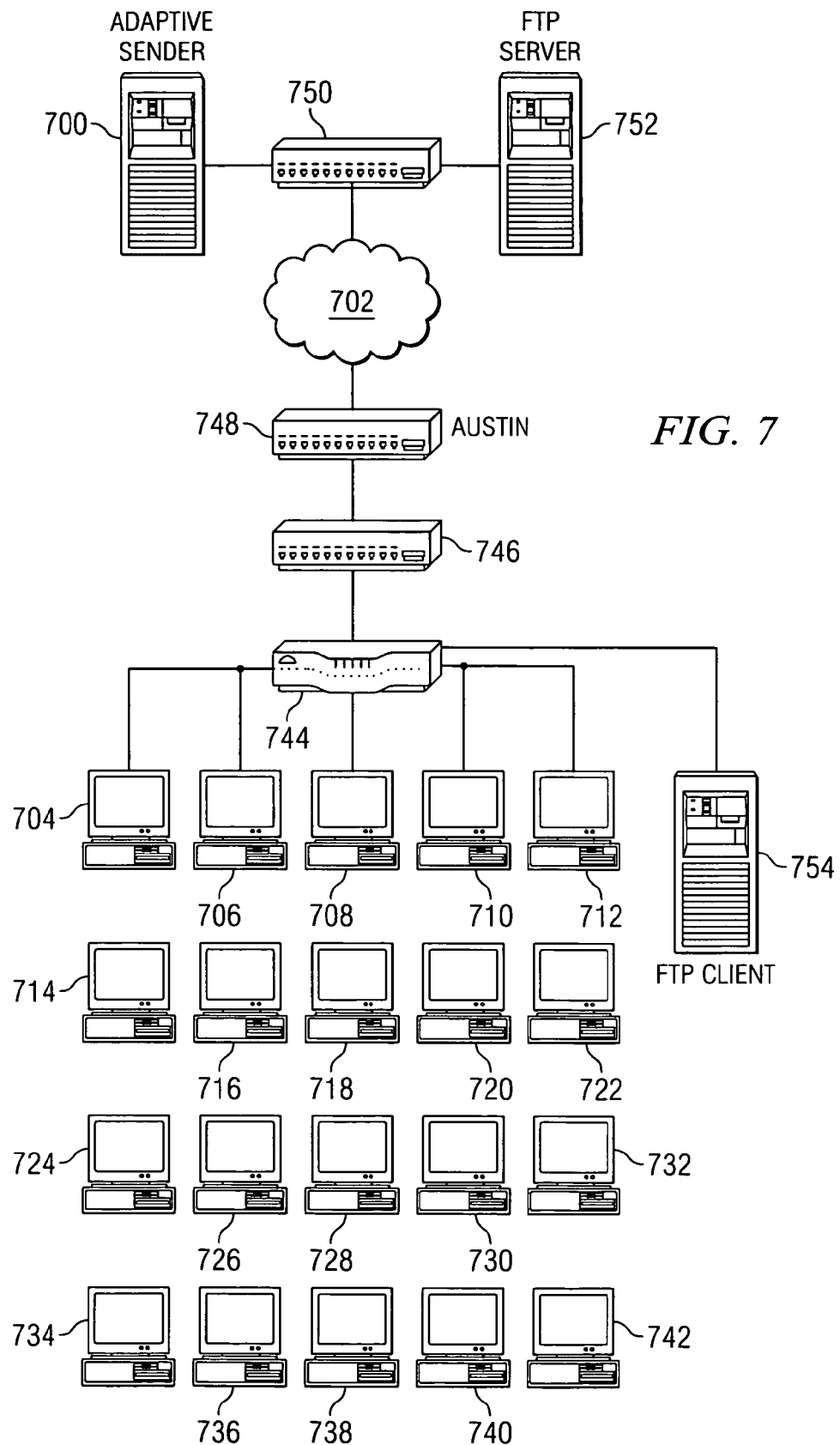
FIG. 7 is a diagram illustrating a network for sending a distribution from an adaptive sender to receivers using priorities in accordance with an illustrative embodiment of the present invention.

Turning to FIG. 7, a diagram illustrating a network for sending a distribution from an adaptive sender to receivers using priorities is depicted in accordance with an illustrative embodiment of the present invention. In this example, adaptive sender 700 sends a distribution across network 702 to clients 704, 706, 708, 710, 712, 714, 716, 718, 720, 722, 724, 726, 728, 730, 732, 734, 736, 738, 740, and 742. 750, 748, 746, and 744 are routers 746 is the backlog router. These clients are connected to router 744, which is in turn connected to router 746. Router 746 connects to router 748. Adaptive sender 700 connects to network 702 through server 750. In this example, network 702 contains twenty hops. In addition to a distribution, file transfer protocol (FTP) server 752 also may send data to FTP client 754. In this example, FTP server 752 sends data to FTP client 754 while the distribution from adaptive sender 700 is sent to the clients. The illustrative example results in the FTP server generating a high demand of traffic causing a flood in the link at router 746. By setting priorities, adaptive sender 700 may use different amounts of bandwidth in sending the distribution to these clients.

Figure 8:
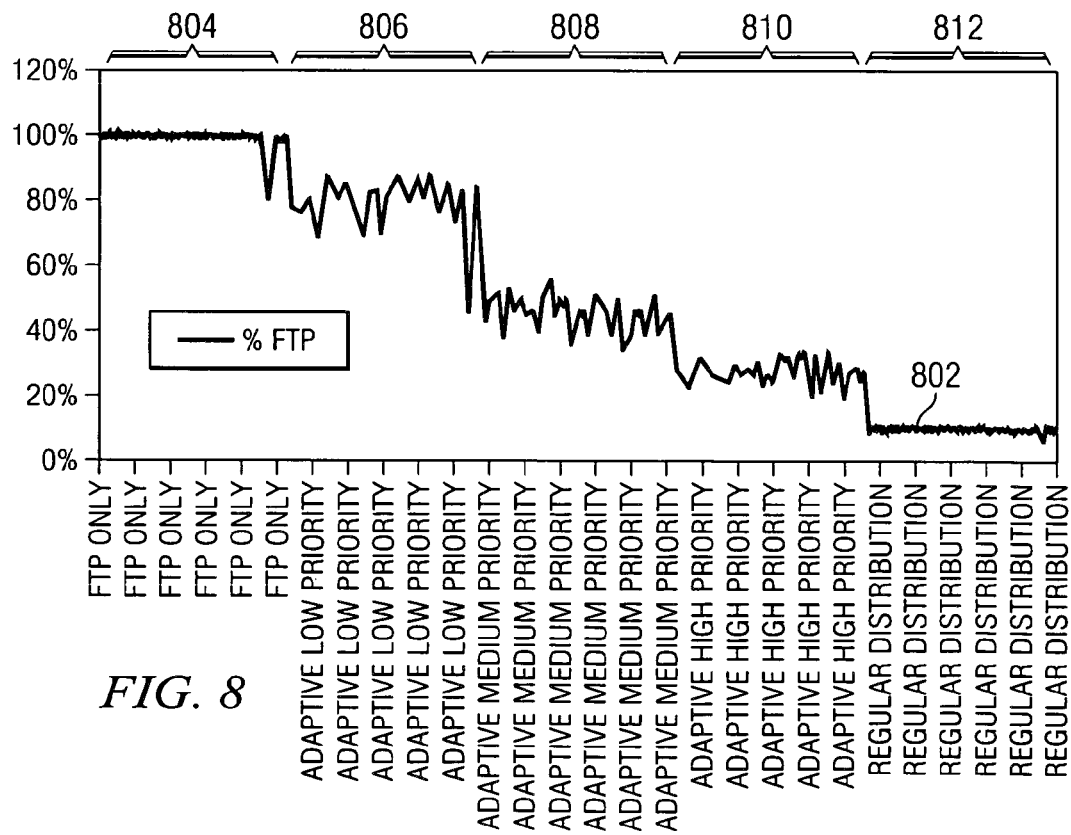
FIG. 8 is a diagram illustrating bandwidth usage in a network in accordance with an illustrative embodiment of the present invention.

Turning now to FIG. 8, a diagram illustrating bandwidth usage in a network is depicted in accordance with an illustrative embodiment of the present invention. The graph in FIG. 8 illustrates the percent of network bandwidth used in transferring data for a network, such as the one illustrated in FIG. 7. In this example, line 802 shows the amount of bandwidth used for different types of distribution. In section 804, only an FTP transfer from FTP server 752 to FTP client 754 from FIG. 7 is shown. One hundred percent of the bandwidth is used in this distribution. With a low-priority setting for the distribution from adaptive sender 700 in FIG. 7 to the clients, router 744 in FIG. 7 allocates around eighty percent of the bandwidth for the FTP transfer as illustrated in section 806. With a medium party, around fifty percent of the bandwidth is used as shown in section 808 for the FTP transfer. As can be seen, as the priority increases, less bandwidth is allocated to the FTP transfer with more bandwidth being allocated to the distribution by the adaptive sender. In section 810, a high priority is given to the distribution to the clients. As can be seen, the FTP transfer drops to a level ranging around thirty percent of the bandwidth. In section 812, adaptive bandwidth control process are not used. As a result, none of the congestion control described is used in this particular section.

Turning now to FIG. 9, a flowchart of a process for configuring user settings for parameters is depicted in accordance with an illustrative embodiment of the present invention. The process illustrated in FIG. 9 may be implemented in parameter thread 628 in FIG. 6. This process is used to allow a user to define or change parameters used in adaptive bandwidth control. In these examples, the parameters are threshold, round trip time maximum change, round trip time smoothing, maximum wait time, and beta. In particular, the process illustrated in FIG. 9 may be used to set parameters for the different gateways for use in different priority levels, such as high, medium, and low. In these examples, a high priority may set beta equal to seven, threshold equal to ninety nine and the maximum wait time equal to twenty. A medium priority may set beta equal to five, threshold equal to forty, and a maximum wait time equal to thirty. With a low priority, beta is set equal to three, threshold equal to twenty five, and a maximum wait time equal to forty. These particular settings are ones used for the different priority levels. These settings may be set through the user interface as provided.

Further, the aspects of the present invention also take into account the effects from any router or server from the gateway to the endpoint in these illustrative examples. This ability is provided through the use of round trip times in the adaptive bandwidth control processes.

The process begins by presenting user settings (step 900). These settings may be presented in a user interface, such as user interface 624 in FIG. 6. The process then receives user input (step 902). A determination is made as to whether the user input changes settings in the parameters (step 904). If the user input changes the settings, the old settings are replaced with the new settings (step 906). Thereafter, the process returns to step 900 to present these settings to the user.

With reference again to step 904, if the user input does not change settings, a determination is made as to whether the user input is to end the process of changing user settings (step 908). If the user input is not to end the process, the process returns to step 900. Otherwise, the user settings are saved (step 910) with the process terminating thereafter. These settings are saved as user defined parameters 626 in FIG. 6 in these examples.

Turning next to FIG. 10, a flowchart of a process for a send thread is depicted in accordance with an illustrative embodiment of the present invention. The process illustrated in FIG. 10 may be implemented in a send thread, such as send thread 602 in FIG. 6.

The process begins by sending a request for how much data can be sent to the congestion control thread (step 1000). The process then receives a reply (step 1002). This reply contains the amount of data that may be sent as a result of the adaptive bandwidth control process executed by the congestion control thread. In response to receiving the reply, the process sends a call to the socket to send only the acceptable amount of data (step 1004). Thereafter, a determination is made as to whether more data is present to be sent (step 1006). If more data is present, the process returns to step 1000. Otherwise, the process terminates.

Figure 11:
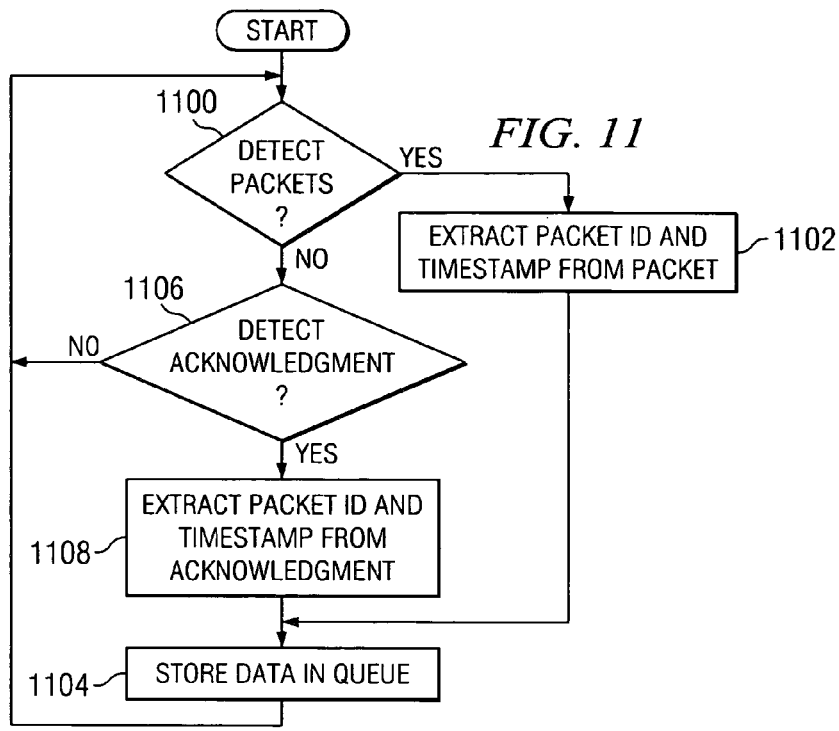
FIG. 11 is a flowchart of a process for a packet sniffing thread in accordance with an illustrative embodiment of the present invention.

Turning next to FIG. 11, a flowchart of a process for a packet sniffing thread is depicted in accordance with an illustrative embodiment of the present invention. The process illustrated in FIG. 11 may be implemented in packet sniffing thread 606 in FIG. 6.

The process begins by determining whether a packet has been detected (step 1100). If a packet has been detected, the process extracts the packet identifier and the timestamp from the packet (step 1102). The process then stores the data in a queue (step 1104). This queue is accessible by a congestion control thread so that the data may be used in determining round trip times and performing adaptive bandwidth control processes.

With reference again to step 1100, if a packet is not detected, a determination is made as to whether an acknowledgement has been detected (step 1106). If an acknowledgement has not been detected, the process returns to step 1100. If an acknowledgement has been detected in step 1106, the packet identifier and the timestamp for the acknowledgement are extracted (step 1108). The process then proceeds to step 1104 as described above.

Figure 12:
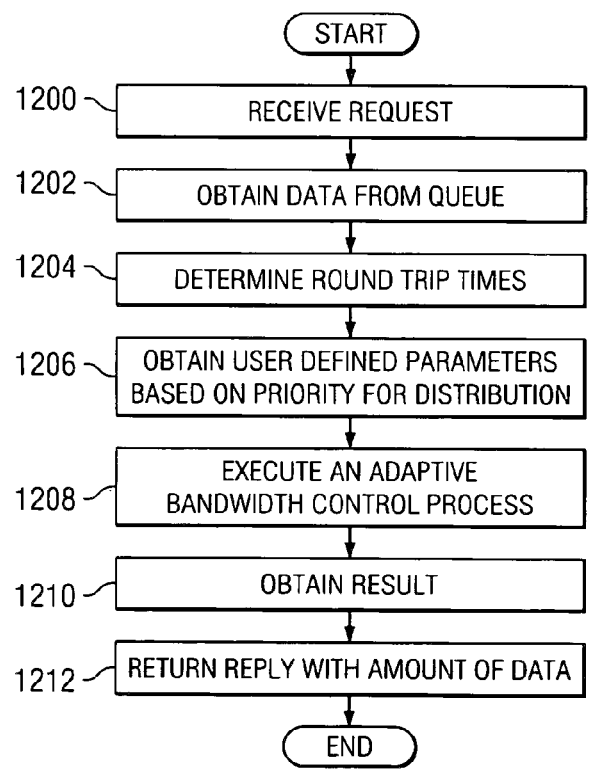
FIG. 12 is a flowchart of a process for a congestion control thread in accordance with an illustrative embodiment of the present invention.

Turning now to FIG. 12, a flowchart of a process for a congestion control thread is depicted in accordance with an illustrative embodiment of the present invention. In this example, the process illustrated in FIG. 12 may be implemented in congestion control thread 604 in FIG. 6.

The process begins by receiving a request from a send thread (step 1200). In these examples, the adaptive control process used by the congestion control thread is located in a gateway. Each gateway has its own values for the different parameters used for the priorities. When a send thread begins sending a distribution, the send thread passes these values along with the current distribution priority to the congestion control thread. The congestion control thread will use the values that correspond to the current distribution priority. This information may be received in step 1200 the first time the request is made for sending a distribution. This request requests an identification of how much data may be sent. Thereafter, data is pulled from the queue (step 1202). This data includes arrival times and packet identifiers. Thereafter, round trip times are identified from the data in the queue (step 1204). Parameters are then obtained based on a priority for the distribution (step 1206). These parameters come from user defined parameters 626 in FIG. 6. In particular, the user defined parameters are for a particular set of parameters associated with the selected priority. In these illustrative examples, the parameters having different settings for different priorities are beta, threshold, and maximum wait time. Thereafter, the process executes an adaptive bandwidth control process (step 1208). This process may be, for example, steps contained within the congestion control thread. Alternatively, the thread may call a function or external process in step 1208. The process then obtains a result (step 1210), and a reply is returned with the amount of data that may be sent (step 1212) with the process terminating thereafter.

Figure 13:
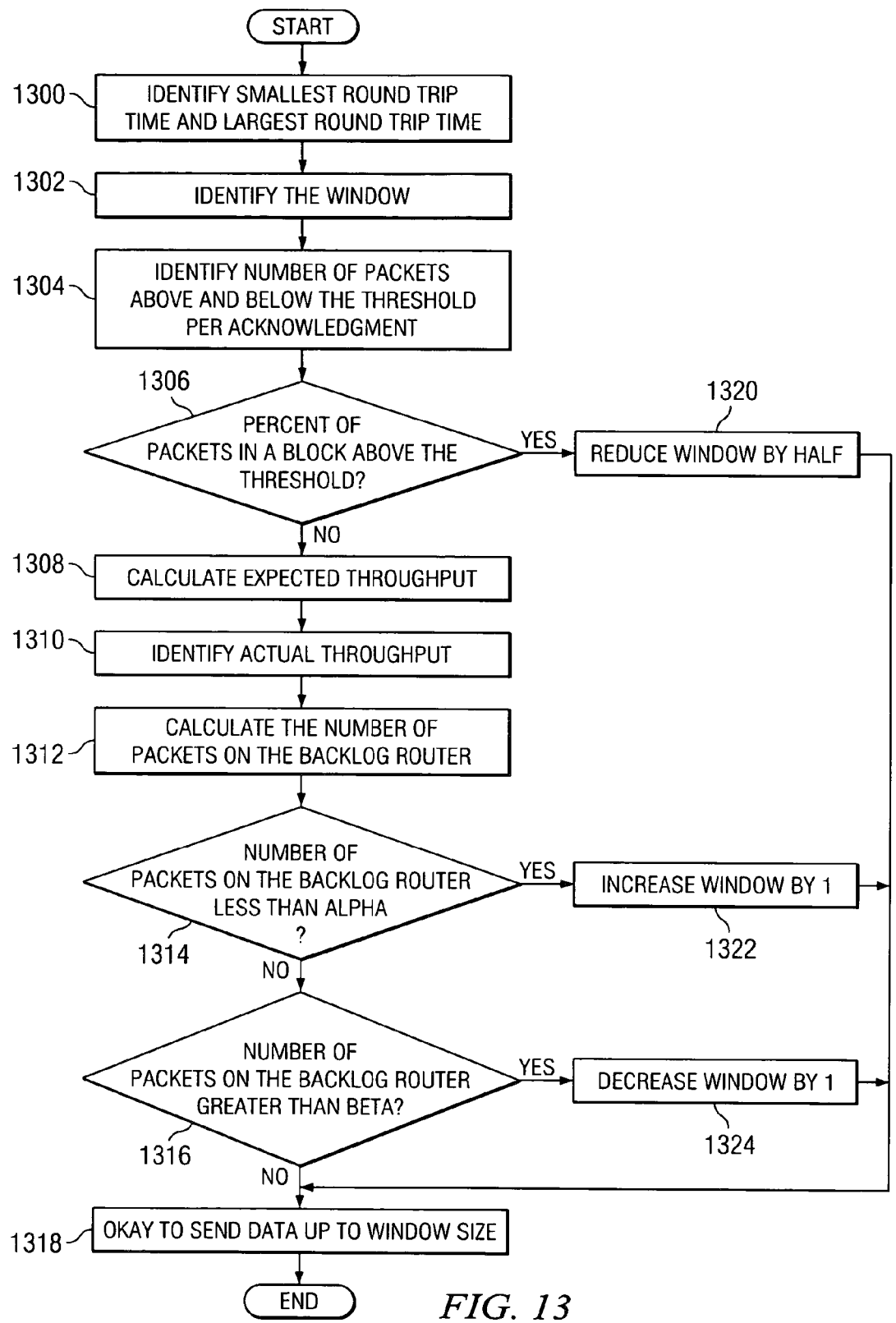
FIG. 13 is a flowchart of a process for performing adaptive bandwidth control in accordance with an illustrative embodiment of the present invention.

Turning next to FIG. 13, a flowchart of a process for performing adaptive bandwidth control is depicted in accordance with an illustrative embodiment of the present invention. The process depicted in FIG. 13 is a more detailed description of step 1208 in FIG. 12.

The process begins by identifying the smallest round trip time and the largest round trip time (step 1300). Thereafter, the window is identified (step 1302). The process then identifies the number of packets above and below the threshold per acknowledgement (step 1304). Next, the process determines whether fifty percent of the packets in a block are above the threshold (step 1306). If fifty percent of the packets in a block are not above the threshold, the expected throughput is calculated step (step 1308). In step 1308, the expected throughput is calculated as follows:

$$E \leftarrow \frac{W}{minRTT}$$

E is the expected throughput, W is the window, and minRTT is the smallest round trip time seen from the round trip times obtained from the queue. Thereafter, the process identifies the actual throughput (step 1310). This actual throughput is identified using the following:

$$A \leftarrow \frac{W}{observedRTT}$$

A is the actual throughput, W is the window, and observedRTT is the value that is measured using the difference in the time from when the packet is sent and when the acknowledgement is received. As a result, the expected throughput is based on the minimum round trip time because an expectation is present that on an idle network the minimum round trip time is always the result of sending a packet. The actual throughput is based on the current network conditions in which the current round trip time is larger than the minimum round trip time. In these examples, minimum round trip time is the same as the base round trip time. The process then calculates the number of packets on the backlog router (step 1312). The actual number of packets is estimated using the following:

$$\text{Diff} \leftarrow (E-A) \cdot minRTT$$

Diff is the number of packets on the backlog router, E is the expected throughput, A is the actual throughput, and minRTT is the smallest round trip time seen.

Next, a determination is made as to whether the number of packets on the backlog router is less than alpha (step 1314). As described above, alpha is an integer that indicates the numeral number of packets that should be present in a backlog router per connection before the window is increased by one packet. If the number of packets on the backlog router is less than alpha, the process increments the window by one (step 1322). Thereafter, the process indicates that it is okay to send data up to the window size (step 1318) with the process terminating thereafter.

With reference again to step 1314, if the number of packets on the backlog router is not less than alpha, a determination is made as to whether the number of packets is greater than beta (step 1316). If the number of packets is greater than beta, the window size is decreased by one (step 1324). The process then proceeds to step 1318 as described above. Otherwise, the process proceeds to step 1318 without changing the window size.

With reference back to step 1306, if fifty percent of the packets in a block are above the threshold, the window is reduced by one half (step 1320). The process then proceeds to step 1318 as described above.

The process illustrated in FIG. 13 above is based on modifications to currently available bandwidth control algorithms, such as the Nice algorithm described in Venkataramani et al., "TCP Nice: A Mechanism for Background Transfers", ACM SIGOPS Operating Systems Review, Vol. 36, Issue SI Winter 2002, pp. 1-15, which is incorporated herein by reference.

The aspects of the present invention have identified a number of parameters that effect the implementation of the adaptive bandwidth control process described in FIG. 13. These parameters and there descriptions are listed as follows:

NICE_ALPHA—An integer that indicates the minimum number of packets in the backlog router per connection before the window is increased. Default is 1. NICE_BASE_DISCARD—An integer that indicates the number of initial base RTT measurements to discard per connection. The reasoning is that when the distribution is first started and the network is not yet saturated unreasonably low base RTT measurements may be made initially. Default is 3.

NICE_BASE_SCALE—A floating point number that species a scaling factor that is applied to the global minimum RTT (v_baseRTT) maintained by nice. Setting this to a small positive number, such as 1.1, may help if the network occasionally allows atypically short RTTs. Default is 0.0.

NICE_BELOW_ONE—An integer that provides a lower bound for v_cwnd_below_one, which is the maximum number of RTTs that a connection may be idle do to a low window. Default is 48.

NICE_BETA—An integer that indicates the maximum number of packets in the backlog router per connection before the window is decreased. This is a default value of beta. Default is based on priority.

NICE_CLAMP—When set clamping the size of the window (snd_cwnd) is limited to be no more than four packets greater than the number of packets that are currently in the network. Default is set.

NICE_COND—When set the sending thread waits on a condition that is signaled by the ack thread instead of waiting an arbitrary amount of time. Default is not set.

NICE_CONG_RTX_Q—When set the cong extension thread will add or update an estimate of each outgoing packet to the rtx_q; which is used to calculate RTTs. The cong thread has the advantage that its estimate of the outgoing time is accurate, but it may drop packets. Default is set.

NICE_DYNAMIC_MSS—When set, adaptive bandwidth control process will start with a low value for MSS and increase it each time an outgoing packet is sniffed that has a larger MSS. This way the MSS should rapidly approach the MSS used for the connection. Default is set.

NICE_FAST—A integer that specifies the number of milliseconds each adaptive bandwidth control process socket is to be in the fast start phase. The longer the fast start phase the more accurate the estimate of maxRTT. However, setting this to a large value causes adaptive bandwidth control process to be effectively disabled for that amount of time. Default is 5000=5 sec.

NICE_FAST_RETURN—When set the fast start phase is exited upon the first failed send( ) with an errno of EWOULDBLOCK. This should minimize the amount of time spent in fast start mode, which does not yield to the gateway, since filling the outgoing queue of the socket should be very fast. Default is set.

NICE_INTERFACE—The interface (network card identifier) that is to be used by nice. At this time, adaptive bandwidth control process is not able to dynamically determine the correct interface. So, the interface needs to be set manually if it is not the first active interface. Typically this would be set to things like "eth1". Default is unset.

NICE_MAX_MULT—A floating point number that specifies a minimum value for maxRTT as a multiple of baseRTT. When set it should help prevent unreasonably low values for maxRTT as well as the low throughput that tends to go along with that. Default is 0.0.

NICE_MIN_MSS—An integer that indicates the minimum MSS to be used. In the interest of efficiency lower values provided by the operating system are ignored in favor of NICE_DEFAULT_MSS. Default is 1000.

NICE_MIN_PACKET—An integer that specifies the minimum amount of data that should be sent at a single time. This is different than NICE_MIN_SEND in that if ok_to_send is less than the value specified it is set to 0. This is to avoid a situation where the congestion control thread keeps telling the send thread to send very small values like 1 byte. By setting this value to 10, the congestion control thread would wait until at least 10 bytes may be sent (returning 0 until calculations specify 10). Default is 0.

NICE_MIN_SEND—An integer that specifies the minimum value of ok_to_send, which means that the congestion control thread will always tell the send thread to send at least this amount of data. By setting this to 10 then even if adaptive calculations specify 3 congestion control thread will return 10. Default is 0.

NICE_NANO_FIXED—An integer that specifies the number of micro seconds that the internal callback function, select_delay( ), is to sleep when used.

NICE_NANO_FIXED has no effect when the callback is set to something other than select_delay( ). When not set, the delay is dynamically calculated based on how long it should take for there to be enough room to send a packet as indicated by the throughput of the last block (determined by the RTT of the fastest packet in the last block and the size of the block). When set to 1234 nanosleep( ) is not called: not set—Delay is calculated dynamically 0—nanosleep( ) is called with a value of 0, which may be a delay as long as 10 ms on some systems 1234—Do not call nanosleep( ) other—Call nanosleep( ) with the number of microseconds specified default is 0.

NICE_PCAP_TIMEOUT—An integer that indicates how long the operating system should wait before returning with a list of packets captured. This variable has no effect on Linux systems since Linux systems only wait until one packet is available regardless of how long it takes. On systems where this variable has an effect, such as Solaris, there is a trade-off between getting accurate RTTs when the time-out is set low and wasting CPU time when the network is idle. Default is 10 ms (the lowest supported value on Solaris).

NICE_QUEUE_LIMIT—The integer that specifies the maximum length of the queue of packets written to by the sniff thread that is read from by the cong thread. The longer the queue the less responsive nice is as the cong thread is acting on information that is delayed by however long it takes for packets to work their way through the queue. Default is 10.

NICE_RTT_MAX_CHANGE—An integer that indicates the maximum amount that the base and max RTTs are allowed to change relative to the previous value. When set, adaptive bandwidth control process should be more tolerant of spurious extreme RTT values. Default is 1.5.

NICE_RTT_MIN_STDS—An integer that indicates the minimum number of standard deviations above the base RTT RTTs will have to be considered above the base RTT. Default in 0.

NICE_RTT_SMOOTHING—An integer that indicates how much the RTT (Round Trip Time) measurements should be smoothed by exponential decay, which is done by averaging with the previous measurement. Setting this may help in cases where nice behaves erratically by over compensating for each fluctuation in RTT. Default is 50.

NICE_RTT STD_SMOOTH—An integer that is similar to NICE_RTT_SMOOTHING, but for standard deviations. The standard deviation is based on a weighted average of recent RTT measurements. Default is 0.

NICE_SEND_RTX_Q—When set the sending thread will add or update an estimate of each outgoing packet to the rtx_q which is used to calculate RTTs. The sending thread has the advantage that it does not drop packets, but its estimate of the outgoing time may be inaccurate. Default is set.

NICE_THROUGHPUT_AVG—An integer that indicates how many of the most recent packets are to be included in the throughput calculation. Larger values should result in more accurate throughput calculations, but at the cost of being less responsive. Default is 20.

NICE_THROUGHPUT_START—An integer that indicates the minimum number of packets that must be sent before the throughput calculations are begun. This is to account for the slow link queue initially being empty, so the throughput during the early portion of the socket may not be typical of the socket and should be ignored. Default is 100.

NICE_WAIT_BASE—An integer that indicates what multiple of v_baseRTT (global minimum RTT) a connection will wait to send before giving up and resetting snd_nxt and snd_una. The timeout calculated is added to that for NICE_WAIT_MAX. Default is 0.

NICE_WAIT_MAX—An integer that indicates what multiple of v_maxRTT (global maximum RTT) a connection will wait to send before giving up and resetting. Default is based on priority.

Turning now to FIG. 14, a flowchart of a process for customizing the sending of distributions to receivers for a customer is depicted in accordance with an illustrative embodiment of the present invention. The process illustrated in FIG. 14 is a process used to provide solutions to customers desiring customized distribution systems within their networks.

The process begins by receiving a customer request (step 1400). This request includes information needed to generate the solution. For example, an identification of gateways within the customer network is contained in the request. Additionally, characteristics of the different clients accessed through the gateways also may be included. Additionally, the requirements of the client for sending different types of distribution also are included in the illustrative example. In response to receiving this request, the client parameters are analyzed for sending distributions to the endpoints (step 1402).

In this analysis, settings are identified for the parameters used for the different priorities (step 1404). In these illustrative examples, the priorities are threshold, beta, and maximum wait time. The parameters identified may be for various priority levels. For example, the illustrative examples use three priority levels, high, medium, and low. Depending on the customer request, a different number of priority levels may be used such as two or four. The parameters generated for a particular priority level may differ for different gateways depending on the client's request and the characteristics of the network in which the gateways are located.

Thereafter, code is generated for adaptive bandwidth control for each gateway (step 1406). This code is packaged such that the code may be installed at a particular gateway.

This code includes the adaptive bandwidth control process and the parameters for the particular gateway. This code also may include the executable files necessary to install and set up the adaptive bandwidth control process on a gateway. Thereafter, the code is sent to the customer (step 1408) for distribution. In this manner, a customer may receive customized distribution systems from a business or other provider in response to a request.

Thus, the aspects of the present invention provide a computer implemented method, apparatus, and computer usable program code for adjusting the rate of data transfers. The aspects of the present invention receive user input to select values for parameters on an application level. These user defined parameters are utilized in an adaptive bandwidth control process to identify the number of packets that may be sent to a destination over a network. The aspects of the present invention allow a user to define parameters based on different network conditions and characteristics. In this manner, the aspects of the present invention allow for adaptive sending of data based on varying types of networks and conditions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adaptively controlling transmission of data, the method comprising:
    receiving data from a source at a plurality of gateways for distribution using a selected priority; and
    transmitting the data from the plurality of gateways to a plurality of receivers using the selected priority, wherein every gateway in the plurality of gateways has an adaptive bandwidth control process and a respective set of parameters for controlling the adaptive bandwidth control process for sending the data at the selected priority and wherein a given set of parameters used for the selected priority at a particular gateway in the plurality of gateways differ from another set of parameters used for the selected priority at another gateway of the plurality of gateways.

2. The method of claim 1, wherein the set of parameters comprise a threshold, beta, and a maximum wait time, wherein the threshold is a percentage of a way from a minimum round trip time to a maximum round trip time, and wherein the beta is an integer that indicates a maximum number of packets in a backlog router per connection before a window is decreased by one packet, and wherein the maximum wait time indicates what multiple of the maximum round trip time a connection will wait to send before resetting.

3. The method of claim 1 further comprising:
    configuring the given set of parameters for the particular gateway in the plurality of gateways based on determined network characteristics.

4. The method of claim 3, wherein the adaptive bandwidth control process takes into account congestion along a path from a gateway in the plurality of gateways to a receiver of the distribution when configuring the given set of parameters.

5. The method of claim 1, wherein bandwidth used is different for different gateways in the plurality of gateways that are each configured to operate at the selected priority.

6. The method of claim 1, wherein the data comprises one of a data file, an application update, and a virus patch.

7. A computer program product comprising:
    a non-transitory computer usable medium having computer usable program code tangibly stored thereon comprising:
    computer usable program code for receiving data from a source at a plurality of gateways for distribution using a selected priority; and
    computer usable program code for transmitting the data from the plurality of gateways to a plurality of receivers using the selected priority, wherein every gateway in the plurality of gateways has an adaptive bandwidth control process and a respective set of parameters for controlling the adaptive bandwidth control process for sending the data at the selected priority and wherein a given set of parameters used for the selected priority at a given gateway of the plurality of gateways differ from another set of parameters used for the selected priority at another gateway of the plurality of gateways.

8. The computer program product of claim 7, wherein the set of parameters comprise a threshold, beta, and a maximum wait time, wherein the threshold is a percentage of a way from a minimum round trip time to a maximum round trip time, and wherein the beta is an integer that indicates a maximum number of packets in a backlog router per connection before a window is decreased by one packet, and wherein the maximum wait time indicates what multiple of the maximum round trip time a connection will wait to send before resetting.

9. The computer program product of claim 7 further comprising:
computer usable program code for configuring the given set of parameters for the particular gateway in the plurality of gateways based on determined network characteristics.

10. The computer program product of claim 9, wherein the adaptive bandwidth control process takes into account congestion along a path from a gateway in the plurality of gateways to a receiver of the distribution when configuring the given set of parameters.

11. The computer program product of claim 7, wherein bandwidth used is different for different gateways in the plurality of gateways that are each configured to operate at the selected priority.

12. The computer program product of claim 7, wherein the data comprises one of a data file, an application update, and a virus patch.

13. A data processing system comprising:
a bus;
a communications unit connected to the bus;
a memory connected to the bus, wherein the memory includes a set of computer usable program code; and
a processor unit connected to the bus, wherein the processor unit executes the set of computer usable program code to receive data from a source at a plurality of gateways for distribution using a selected priority; and transmit the data from the plurality of gateways to a plurality of receivers using the selected priority, wherein every gateway in the plurality of gateways has an adaptive bandwidth control process and a respective set of parameters for controlling the adaptive bandwidth control process for sending the data at the selected priority and wherein a given set of parameters used for the selected priority at a given gateway of the plurality of gateways differ from another set of parameters used for the selected priority at another gateway of the plurality of gateways.

14. The data processing system of claim 13, wherein the set of parameters comprise a threshold, beta, and a maximum wait time, wherein the threshold is a percentage of a way from a minimum round trip time to a maximum round trip time, and wherein the beta is an integer that indicates a maximum number of packets in a backlog router per connection before a window is decreased by one packet, and wherein the maximum wait time indicates what multiple of the maximum round trip time a connection will wait to send before resetting.

15. The data processing system of claim 13, wherein the processor unit further executes the computer usable program code to configure the given set of parameters for the particular gateway in the plurality of gateways based on determined network characteristics.

16. The data processing system of claim 15, wherein the adaptive bandwidth control process takes into account congestion along a path from a gateway in the plurality of gateways to a receiver of the distribution when configuring the given set of parameters.

17. The data processing system of claim 13, wherein bandwidth used is different for different gateways in the plurality of gateways that are each configured to operate at the selected priority.

18. The data processing system of claim 13, wherein the data comprises one of a data file, an application update, and a virus patch.

19. A data processing system for adaptively controlling transmission of data, the data processing system comprising a processor and a memory having program code stored therein that is operable when executed by the processor for performing steps of:
receiving data from a source at a plurality of gateways for distribution using a selected priority; and
transmitting the data from the plurality of gateways to a plurality of receivers using the selected priority, wherein every gateway in the plurality of gateways has an adaptive bandwidth control process and a respective set of parameters for controlling the adaptive bandwidth control process for sending the data at the selected priority and wherein a given set of parameters used for the selected priority at a particular gateway in the plurality of gateways differ from another set of parameters used for the selected priority at another gateway of the plurality of gateways.

\* \* \* \* \*